(12) United States Patent
Stoner et al.

(10) Patent No.: US 11,127,307 B2
(45) Date of Patent: Sep. 21, 2021

(54) JOINT MEDIA BROADCASTING AND LIVE MEDIA METHODS AND SYSTEMS

(71) Applicant: Talking Stick, Inc., Winter Park, FL (US)

(72) Inventors: Theodore A. Stoner, Winter Park, FL (US); Benjamin Gauthier, Winter Park, FL (US); Jacob Quattrocchi, Winter Park, FL (US); Bryan Eaton, Winter Park, FL (US)

(73) Assignee: Talking Stick, Inc., Winter Park, FL (US)

( * ) Notice: Subject to any disclaimer, the term of this patent is extended or adjusted under 35 U.S.C. 154(b) by 349 days.

(21) Appl. No.: 15/784,489

(22) Filed: Oct. 16, 2017

(65) Prior Publication Data

US 2018/0108266 A1    Apr. 19, 2018

Related U.S. Application Data

(60) Provisional application No. 62/408,752, filed on Oct. 15, 2016.

(51) Int. Cl.
*G09B 7/02* (2006.01)
*H04L 29/06* (2006.01)
(Continued)

(52) U.S. Cl.
CPC ........... *G09B 7/02* (2013.01); *G06Q 30/0203* (2013.01); *H04L 65/4023* (2013.01);
(Continued)

(58) Field of Classification Search
CPC .. G09B 7/02; G06Q 30/0203; H04L 65/4023; H04L 65/4076
See application file for complete search history.

(56) References Cited

U.S. PATENT DOCUMENTS 8,886,011 B2 * 11/2014 Chou ...................... H04N 5/91
  386/246
8,887,067 B2 * 11/2014 Tripathi .............. H04L 12/1831
  715/753

(Continued)

OTHER PUBLICATIONS

International Search Report and Written Opinion for International (PCT) Patent Application No. PCT/US2017/056746 dated Dec. 27, 2017, 11 pages.

*Primary Examiner* — Malina D. Blaise
(74) *Attorney, Agent, or Firm* — Sheridan Ross P.C.

(57) ABSTRACT

Embodiments provide systems and methods for conducting a media-based interaction between a host user and a plurality of audience users. According to one embodiment, conducting a media-based interaction between a host user and a plurality of audience users can comprise managing a queue of a plurality of questions. Each question of the plurality of questions can be presented by one of the plurality of audience users. An interactive media session can be initiated between the host user and the plurality of audience users and a question from the queue of the plurality of questions can be presented to the host user. An answer to the question provided by the host user can be streamed in the interactive media session and recorded and the queue of the plurality of questions can be updated to remove the question provided to the host user.

26 Claims, 8 Drawing Sheets

(51) Int. Cl.
*G06Q 30/02* (2012.01)
*G06F 16/28* (2019.01)
*G06F 16/2455* (2019.01)

(52) U.S. Cl.
CPC ...... H04L 65/4076 (2013.01); *G06F 16/2455* (2019.01); *G06F 16/284* (2019.01)

(56) References Cited

U.S. PATENT DOCUMENTS

| | | | | |
|---|---|---|---|---|
| 9,165,073 | B2* | 10/2015 | Kiraz | G06F 3/04842 |
| 9,883,249 | B2* | 1/2018 | Taylor | H04N 21/252 |
| 10,440,436 | B1* | 10/2019 | Taylor | H04N 21/234345 |
| 2003/0110503 | A1* | 6/2003 | Perkes | H04N 21/84 |
| | | | | 725/86 |
| 2006/0286539 | A1* | 12/2006 | Tidwell-Scheuring | G09B 5/00 |
| | | | | 434/353 |
| 2008/0120101 | A1* | 5/2008 | Johnson | G10L 15/22 |
| | | | | 704/235 |
| 2008/0154889 | A1* | 6/2008 | Pfeiffer | G06F 16/738 |
| 2008/0244410 | A1* | 10/2008 | Schormann | G06F 3/04886 |
| | | | | 715/723 |
| 2009/0092234 | A1* | 4/2009 | St. Onge | H04L 12/1818 |
| | | | | 379/88.13 |
| 2010/0247062 | A1* | 9/2010 | Bailey | G11B 27/034 |
| | | | | 386/280 |
| 2011/0264595 | A1* | 10/2011 | Anspach | G06Q 30/0629 |
| | | | | 705/306 |
| 2012/0293686 | A1* | 11/2012 | Karn | G11B 27/00 |
| | | | | 348/231.3 |
| 2013/0050260 | A1* | 2/2013 | Reitan | G09G 5/377 |
| | | | | 345/633 |
| 2013/0226758 | A1* | 8/2013 | Reitan | G06Q 40/00 |
| | | | | 705/35 |
| 2014/0037215 | A1* | 2/2014 | Kumar | G06K 9/00718 |
| | | | | 382/197 |
| 2014/0118474 | A1* | 5/2014 | Fluhr | H04N 7/152 |
| | | | | 348/14.09 |
| 2014/0236850 | A1* | 8/2014 | Holland | G06Q 10/1053 |
| | | | | 705/321 |
| 2015/0106713 | A1* | 4/2015 | Diamond | G06F 3/0484 |
| | | | | 715/716 |
| 2015/0262616 | A1* | 9/2015 | Jaime | H04L 65/4076 |
| | | | | 386/228 |
| 2016/0267392 | A1* | 9/2016 | Prager | G06N 7/005 |
| 2017/0289624 | A1* | 10/2017 | Avila | H04L 65/604 |

* cited by examiner

JOINT MEDIA BROADCASTING AND LIVE MEDIA METHODS AND SYSTEMS

CROSS REFERENCE TO RELATED APPLICATION

The present application claims the benefits of and priority, under 35 U.S.C. § 119(e), to U.S. Provisional Application No. 62/408,752 filed Oct. 15, 2016 by Stoner et al. and entitled "Joint Video Broadcasting and Live Video Methodologies" of which the entire disclosure is incorporated herein by reference for all purposes.

FIELD OF THE DISCLOSURE

Embodiments of the present disclosure relate generally to methods and systems for conducting interactive communication sessions and more particularly to conducting a media-based interaction between a host user and a plurality of audience users and directed to providing, by the host user, answers to a managed queue of questions submitted by the audience users.

BRIEF SUMMARY

Embodiments of the disclosure provide systems and methods for conducting a media-based interaction between a host user and a plurality of audience users and directed to providing, by the host user, answers to a managed queue of questions submitted by the audience users. According to one embodiment, conducting a media-based interaction between a host user and a plurality of audience users can comprise managing a queue of a plurality of questions. Each question of the plurality of questions can be presented by one of the plurality of audience users. An interactive media session can be initiated between the host user and the plurality of audience users and a question from the queue of the plurality of questions can be presented to the host user. An answer to the question provided by the host user can be streamed in the interactive media session and recorded and the queue of the plurality of questions can be updated to remove the question provided to the host user.

Figure 1:
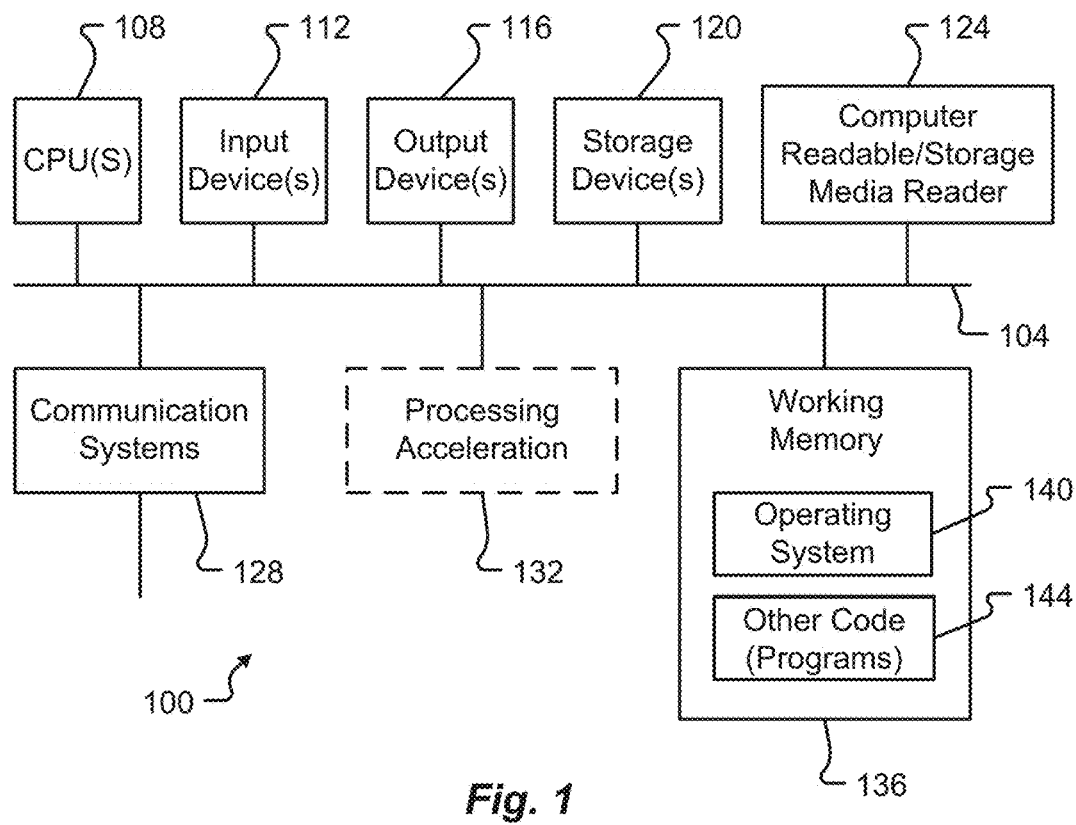
FIG. 1 is a block diagram illustrating components of an exemplary computing device which may be used to implement various embodiments of the present disclosure.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Embodiments of the disclosure provide systems and methods for conducting a media-based interaction between a host user and a plurality of audience users and directed to providing, by the host user, answers to a managed queue of questions submitted by the audience users. As used herein, the term "media" generally refers to video but can include video, audio, images, graphics, texts, or any combination thereof. As such, and as will be described in detail below, a "media session" can comprise a broadcast of a video stream from a host or presenter to any number of audience members or consumers. In some cases, these audience members can interact with the host through side-band channels such as email, instant messages, text messages, social media messages, etc., or may be temporarily joined to the media session to stream media along with the host.

According to one embodiment, conducting a media-based interaction between a host user and a plurality of audience users can comprise managing a queue of a plurality of questions. Each question of the plurality of questions can be presented by one of the plurality of audience users. An interactive media session can be initiated between the host user and the plurality of audience users and a question from the queue of the plurality of questions can be presented to the host user. An answer to the question provided by the host user can be streamed in the interactive media session and recorded and the queue of the plurality of questions can be updated to remove the question provided to the host user.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating components of an exemplary computing device which may be used to implement various embodiments of the present disclosure. The computer system 100 is shown comprising hardware elements that may be electrically coupled via a bus 104. The hardware elements may include one or more central processing units (CPUs) 108; one or more input devices 112 (e.g., a mouse, a keyboard, etc.); and one or more output devices 116 (e.g., a display device, a printer, etc.). The computer system 100 may also include one or more storage devices 120. By way of example, storage device(s) 120 may be disk drives, optical storage devices, solid-state storage devices such as a random access memory ("RAM") and/or a read-only memory ("ROM"), which can be programmable, flash-updateable and/or the like.

The computer system 100 may additionally include a computer-readable storage media reader 124; a communications system 128 (e.g., a modem, a network card (wireless or wired), an infra-red communication device, etc.); and working memory 136, which may include RAM and ROM devices as described above. The computer system 100 may also include a processing acceleration unit 132, which can include a DSP, a special-purpose processor, and/or the like.

The computer-readable storage media reader 124 can further be connected to a computer-readable storage medium, together (and, optionally, in combination with storage device(s) 120) comprehensively representing remote, local, fixed, and/or removable storage devices plus storage media for temporarily and/or more permanently containing computer-readable information. The communications system 128 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 100 may also comprise software elements, shown as being currently located within a working memory 136, including an operating system 140 and/or other code 144. It should be appreciated that alternate embodiments of a computer system 100 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 108 as described herein may include, but are not limited to, at least one of Qualcomm® Snapdragon® 800 and 801, Qualcomm® Snapdragon® 120 and 115 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments®

Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture. The computer system 100 may function as the systems, devices, or components described herein.

Figure 2:
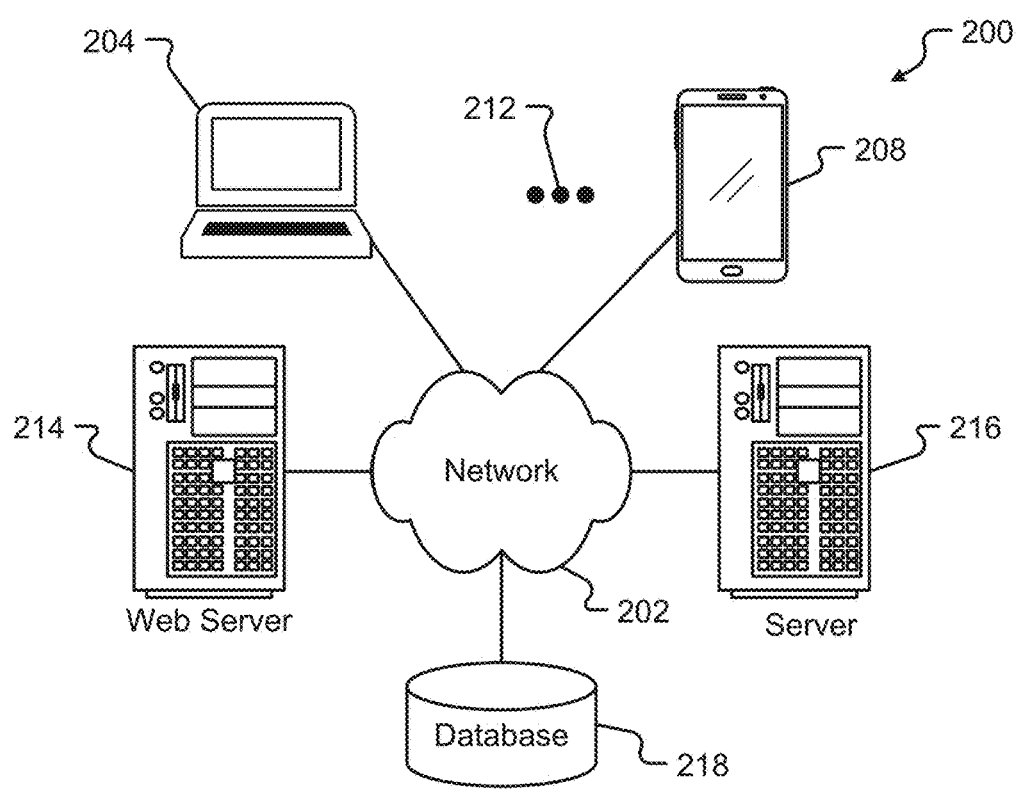
FIG. 2 is a block diagram illustrating components of an exemplary computing environment in which various embodiments of the present disclosure may be implemented.

FIG. 2 is a block diagram illustrating components of an exemplary computing environment in which various embodiments of the present disclosure may be implemented. The computing environment 200 includes one or more user computers, or computing devices as described above, such as a laptop of other personal computer 204, a communication device 208, and/or more 212. The computing devices 204, 208, 212 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 204, 208, 212 may also have any of a variety of applications, including for example, database client and/or server applications, and web browser applications. Alternatively, the computing devices 204, 208, 212 may be any other electronic device, such as a thin-client computer, Internet-enabled mobile telephone, and/or personal digital assistant, capable of communicating via a network 202 and/or displaying and navigating web pages or other types of electronic documents or information. Although the exemplary computing environment 200 is shown with two computing devices, any number of user computers or computing devices may be supported.

The computing environment 200 may also include one or more servers 214, 216 also as described above. In this example, server 214 is shown as a web server and server 216 is shown as an application server. The web server 214, which may be used to process requests for web pages or other electronic documents from computing devices 204, 208, 212. The web server 214 can be running an operating system including any of those discussed above, as well as any commercially-available server operating systems. The web server 214 can also run a variety of server applications, including SIP (Session Initiation Protocol) servers, HTTP(s) servers, FTP servers, CGI servers, database servers, Java® servers, and the like. In some instances, the web server 214 may publish operations available operations as one or more web services.

The computing environment 200 may also include one or more file and or/application servers 216, which can, in addition to an operating system, include one or more applications accessible by a client running on one or more of the computing devices 204, 208, 212. The server(s) 216 and/or 214 may be one or more general purpose computers capable of executing programs or scripts in response to the computing devices 204, 208, 212. As one example, the server 216, 214 may execute one or more web applications. The web application may be implemented as one or more scripts or programs written in any programming language, such as Java®, C, C#®, or C++, and/or any scripting language, such as Perl, Python, or TCL, as well as combinations of any programming/scripting languages. The application server(s) 216 may also include database servers, including without limitation those commercially available from Oracle®, Microsoft®, Sybase®, IBM® and the like, which can process requests from database clients running on a computing device 204, 208, 212.

The web pages created by the server 214 and/or 216 may be forwarded to a computing device 204, 208, 212 via a web (file) server 214, 216. Similarly, the web server 214 may be able to receive web page requests, web services invocations, and/or input data from a computing device 204, 208, 212 (e.g., a user computer, etc.) and can forward the web page requests and/or input data to the web (application) server 216. In further embodiments, the server 216 may function as a file server. Although for ease of description, FIG. 2 illustrates a separate web server 214 and file/application server 216, those skilled in the art will recognize that the functions described with respect to servers 214, 216 may be performed by a single server and/or a plurality of specialized servers, depending on implementation-specific needs and parameters. The computer systems 204, 208, 212, web (file) server 214 and/or web (application) server 216 may function as the system, devices, or components described herein.

The computing environment 200 may also include a database 218. The database 218 may reside in a variety of locations. By way of example, database 218 may reside on a storage medium local to (and/or resident in) one or more of the computers 204, 208, 212, 214, 216. Alternatively, it may be remote from any or all of the computers 204, 208, 212, 214, 216, and in communication (e.g., via the network 202) with one or more of these. The database 218 may reside in a storage-area network ("SAN") familiar to those skilled in the art. Similarly, any necessary files for performing the functions attributed to the computers 204, 208, 212, 214, 216 may be stored locally on the respective computer and/or remotely, as appropriate. The database 218 may be a relational database, such as Oracle 20i®, that is adapted to store, update, and retrieve data in response to SQL-formatted commands.

Figure 3:
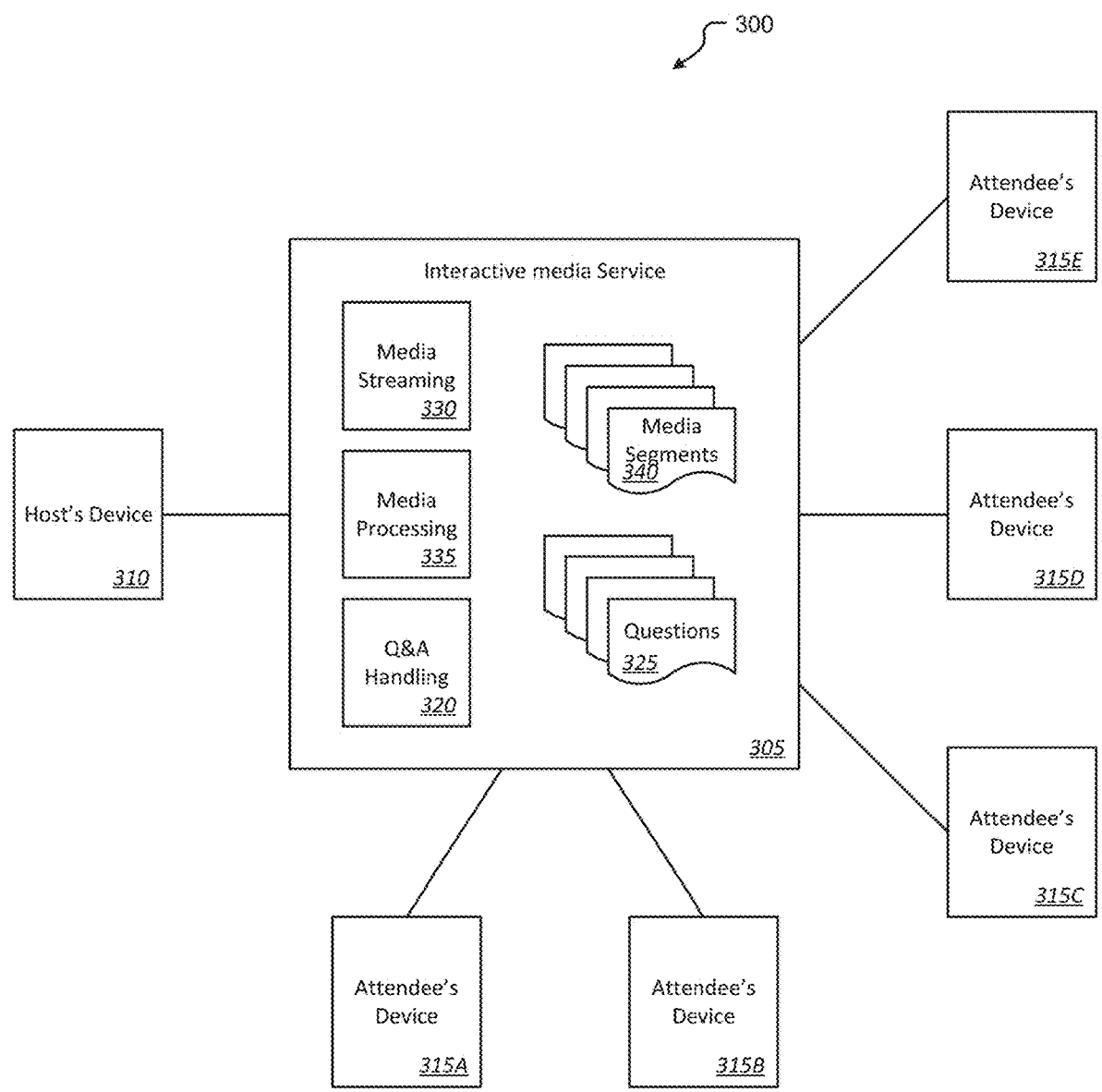
FIG. 3 is a block diagram illustrating components of a system for conducting media-based interactions according to one embodiment of the present disclosure.

FIG. 3 is a block diagram illustrating components of a system for conducting media-based interactions according to one embodiment of the present disclosure. As illustrated in this example, a system 300 can include an interactive media service 305 comprising one or more applications executing on one or more application servers, media servers, web servers, and/or other servers as described above. The system 300 can also include a number of client devices 310 and 315A-315E. These devices can include a host user's client device 310 and any number of audience user's or attendee's client devices 315A-315E. Each client device 310 and 315A-315E can access the interactive media service 305 via one or more networks (not shown here) such as the Internet and/or other network(s) as described above. The client devices 310 and 315A-315E may access one or more web pages or other interfaces provided by the interactive media service 305, for example, using a browser and/or other client application (not shown here) executing on the client device.

Generally speaking, the interactive media service 305 allows a host user, through the host's user's client device 310, to initiate an interactive media session with one or more of attendees through the audience user's client device 315A-315E. Prior to initiation of the interactive media session and/or while the session is being conducted, the audience users can, through their respective client devices 315A-315E, submit questions or comments to be answered or addressed by the host user during the media session. These questions or comments can be accumulated and presented to the host user through an interface provided by the interactive media service through the host user's client device 310 to the host user. The questions may be presented to the host user in an order in which they were submitted, in an order of popularity based on voting by the audience users, based on a priority of the submitting audience user, e.g., by paying a fee or otherwise earning or gaining preference, etc.

During the media session, the host user can be presented with these questions or comments through an interface provided by the interactive media service 305 to the host user's client device 310. An answer or response to a presented question or comment can be captured by a camera associated with the host user's client device 310 and streamed through the interactive media service 305 to the audience user's client devices 315A-315E. The interactive media service can also record this streamed media response for archiving and later retrieval and viewing by the audience users. As will be seen, the stream can be recorded in total and comprising a media of the entire session as well as in individual media clips representing individual questions or comments and the corresponding answer or response by the host user. In this way, audience users can later review the entire session or may retrieve and replay media clips of individual questions and answers of particular interest.

More specifically, the interactive media service 305 can execute one or more applications or can otherwise comprise one or more modules or components, for handling questions submitted by the audience users and conducting the media session including streaming the answers provided by the host user, recording those answers, and making the recorded media available to the audience users. For example, the interactive media service 305 can execute one or more applications comprising a question handling module 320. The question handling module 320 can provide a user interface or portion of a user interface (not shown here) to each attendee's client device 315A-315E and though which audience users can enter questions, "like" or otherwise vote on submitted questions, etc. The question handling module 320 can accumulate these submitted questions or comments in a queue of questions 325 and manage the order of questions in the queue of questions 325 based on order in which they were submitted, popularity of the question, e.g., determined by voting on the questions by audience members, priority or preference of the submitting user, e.g., based on voting by other users or a fee paid by the submitter, etc. The question handling module 320 can also present these questions to the host user through an interface or portion of an interface provided to the host user's client device and maintain the order and content of the queue of questions 325 during the conduct of the media session. Additional details of an exemplary process for managing the queue of questions 325 according to one embodiment will be described below with reference to FIG. 6.

The interactive media service 305 can execute one or more applications comprising a media streaming module 330. The media streaming module 330 can initiate the media session comprising a broadcast media stream from the host user's client device 310 to the client devices 315A-315E of the audience users or attendees. In some cases, the media streaming module 330 can also join one or more of the audience users to the media stream, e.g., broadcast a media captured by a camera associated with an attendee's client device 315A while that attendee asks his submitted question when it is selected to be presented to the host. In such cases, the attendee can be removed or un-joined from the session while the host provides the answer. The media streaming module 330 can continue to manage the media session until concluded, e.g., after a predefined or scheduled period of time, until the host user indicates a conclusion, etc. Details of an exemplary process for conducting interactive media sessions and streaming the media response according to one embodiment will be further described below with reference to FIG. 4.

While the media streaming module 330 streams the media responses and comments by the host user, one or more applications comprising a media recording module 335 can capture and save the streamed media. Capturing and saving the streamed media can comprise capturing, by the media recording module 335, snippets of the media according to a predefined time duration. The predefined time duration can be set depending upon bandwidth and/or processing capacity available to steam, process, and/or save the captured snippets and can vary accordingly depending upon the implementation. These fixed-duration snippets can be saved and continuously captured while the host continues to provide an answer to a presented question. Once the answer to that question is complete, the media recording module 335 can stitch these snippets together and save them as a media segment 340 representing an answer to a particular question. These media segments 340 can each be associated with the question 325 to which they are directed by the name assigned to the saved segment 340, e.g., containing a name, number, text, etc. of the associated question, by metadata of the saved media segment 340 indicating the name or content of the associated question 325, etc. Stitching together the snippets into the media segments 340 can comprise concatenating the captured snippets, linking the snippets through pointers, hyperlinks, or metadata, or otherwise physically or logically combining the individual snippets into a single media clip or segment. Additionally, the media recording module 335 can similarly combine these clips or segments into an overall media representing the complete session. In this way, the entire session can be captured and made available to the audience users for later, i.e., after the live broadcast has ended, and in a manner that the users can retrieve and view the entire session of individual clips containing answers to individual questions of particular interest or relevance to that user. Additional details of an exemplary process for recording media according to one embodment will be described below with reference to FIG. 5.

Numerous variations on these systems and processes are contemplated and considered to be within the scope of the present disclosure. For example, it would be helpful and useful for the interactive media service 305 to integrate with various social media networks and other platforms. Twitter, for example, is a platform that already has heavy participation in question and answer formats. Embodiments of the present disclosure can enable the integration of this or similar functionality to support the question submission and media streaming described above. More specifically and as known in the art, Tweets from Twitter use hashtags to identify content, users, etc. According to one embodiment, specific hashtag identifiers in Tweets or similar social media messages can be captured and placed into the question queue 325. A date stamp on the messages can be used to assign the appropriate order to such messages saved in the question queue 325. These questions can be stored with the original message content and other information. The question handling module 320 can store the data for the incoming message and assign it to the corresponding question in the question queue 325. When this question is answered, the recorded media segment 340 can be stored specific to that question (as described above) and, in some cases, a link to the media segment 340 can be sent back to the originator of the message through the Twitter or other social media account of the originator.

According to one embodiment, the interactive media service can be adapted to automatic respond to Tweets or other social media messages with previously recorded media content, i.e., clips/segments. For example, based on the hashtags or similar identifiers in a received social media message, a previously saved media clip related to the same or similar question can be located. Once located, one or more links to the specific media clips or segments 340 can be returned to the originator of the Tweet or other social media message.

As noted above, the order of question in the queue of questions 325 can be managed based on a chronological order in which the questions are submitted but can be changed based on other factors such as a popularity of the question. This popularity can be determined by allowing audience users to "like" or otherwise vote on the questions pending in the queue 325. According to one embodiment, the queue of questions 325 can be provided to the audience users through a user interface such as will be described below. Each question can be displayed along with a button, link, icon, or similar user interface element to allow the viewing audience user to vote on one or more questions. For example, the question can be displayed with a "heart" icon that the user can click to approve of or vote in favor of that question. The rank placement of each question in the queue 325 can then be determined by the question handling module 320 base on the sum of the "hearts" that question receives. In a further variation of this implementation, each user may be permitted a default ability to spend one "heart" on each question submitted without cost but may be allowed to purchase additional "hearts" to add to a particular question to increase that question's rank placement in the queue 325. In this implementation, popularity is therefore assigned to questions through both total number of interested parties and a total amount of money spent on that question.

Also noted above, an additional media stream, e.g., a stream from the originator of a question presented to the host, can be the broadcast of the host's media stream in some cases. According to one embodiment, a decision on whether to add another stream to the session can be made by determining whether the question is popular enough to grant the ability to the originator of the question to stream the question live. The decision can additionally or alternatively be based on the popularity of the originator of the question, the current popularity of the broadcast media session, the number of live attendees, the number of questions submitted and/or pending in the queue 325, and an overall amount of "hearts" for a question which can be based in whole or in part on an amount of money spent on voting. In cases, if this amount exceeds a particular threshold or falls within a particular range, the originating user can automatically be allowed to jointly stream their media with the host.

As can be understood, connecting two or more media streams to broadcast out can require a significant amount of overhead and time to prepare. Accordingly, and in some cases, the media streaming module 330 can be adapted to pre-stage such streaming, i.e., join a question originator to the host stream while the host stream continues to be the only one visible to the attendees. This pre-staging can be performed, for example, based on the position of a qualifying question's position in the queue 325, e.g., at or near the top of the queue 325. More specifically, the question handling module 320 can maintain the rank placement of each question in the queue 325 in real-time before, during, and after the media session. When a question reaches a top of the queue, i.e., becomes the current or next question to be presented, a classification, e.g., an indication of whether the host agrees to take that question, can be assigned to that question on a button click or other user interface action by the host user that locks the position of the question as next in line. The interactive media service 305 can then determine if the originator of that question can stream their media to ask the question as described above. If the originator of the question qualifies to be streamed live with the host, the media streaming module 330 can proactively add that user's media streams to the media broadcast without making the visible or audible to the other users. When the host user then presses another button or otherwise performs a user interface action to signify that they are ready for the next question, the media streaming module 330 can automatically switch to display the media streams from the pre-staged audience user who originated the question.

According to one embodiment, the question handling module 320 can analyze current and past questions being submitted to a host, questions submitted to related broadcasts/hosts, the title of the broadcast(s), and/or other factors. Based on similarities, patterns, matching or related keywords, and any of a variety of algorithms, heuristics, machine learning, and/or artificial intelligence methods, the question handling module can predict and then submit to the question queue 325 other, contextually relevant questions previously submitted by other audience users and saved in a database or generated by various machine processes. Similarly, the questions that users ask can be tracked historically. This historical record can be used determine uniquely relevant advertisements to display, e.g., within the media stream, to specifically, and perhaps individually, targeted audience users based on submitted questions.

In some cases, a form of crowdsourcing can be used to identify particularly relevant and/or popular content and/or questions. More specifically, data relevant to a broadcast from a host and/or question(s) from one or more audience users, such as the number of favorable votes, e.g., hearts, received for that host, audience member, question, etc., can be collected and displayed to the host and/or audience watching. Specific users may qualify to have an additional opportunity to stream their media or ask another question based on the decision of the host and/or this collected data. So for example, an audience user who has received a large number of favorable votes, e.g., exceeding a particular, predefined threshold number, for asking particularly useful, insightful, relevant, inquiring, humorous, thought-provoking, etc. questions may be given extra opportunities to ask questions, ask follow up questions on a presented question, etc. In some cases, this data can also be used as a basis for advancing a questions position in the queue. For example, a question from a particularly popular user or one who is highly regarded based on a number of favorable votes exceeding a threshold, may be moved ahead of other questions in the queue including, in some cases, being placed at the top of the queue.

Figure 4:
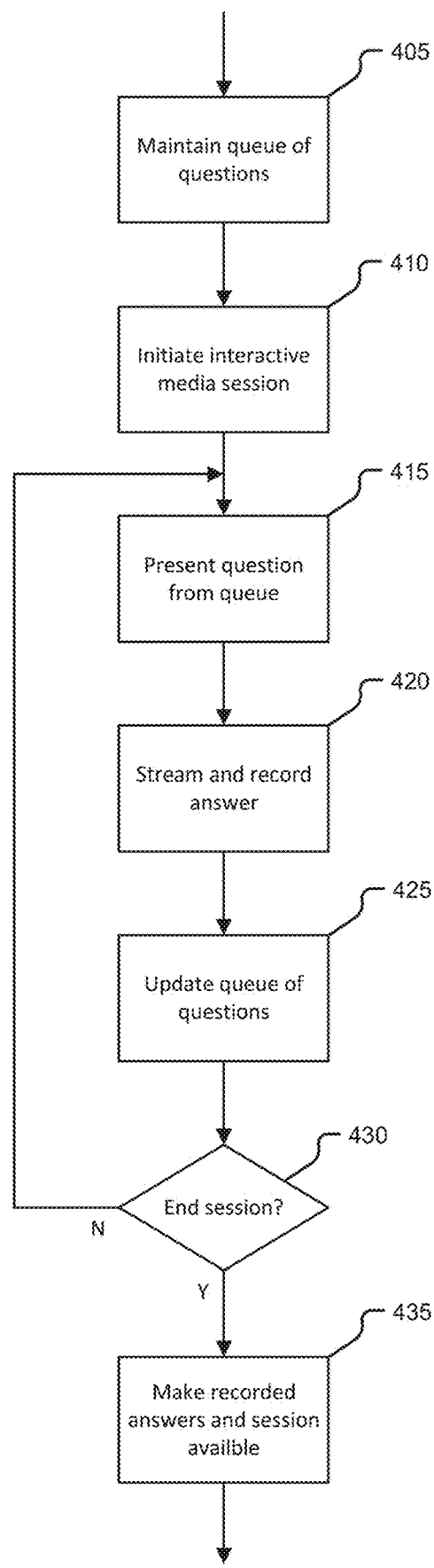
FIG. 4 is a flowchart illustrating an exemplary process for conducting media-based interactions according to one embodiment of the present disclosure.

FIG. 4 is a flowchart illustrating an exemplary process for conducting media-based interactions according to one embodiment of the present disclosure. As illustrated in this example, conducting a media-based interaction between a host user and a plurality of audience users can comprise managing 405 a queue of a plurality of questions. Each question of the plurality of questions can be presented by one of the plurality of audience users. For example, the questions can be submitted through various forms of electronic communication including but not limited to email, voicemail, Short Message Service (SMS) or Multimedia Message Service (MMS) messages, media message, Instant Message (IM), various forms of messages though social media networks or channels, etc. Once received, these questions can be placed into a queue of questions to be used during the media-based interaction. Details of an exemplary process for managing the queue of questions will be described below with reference to FIG. 6.

Once questions have been accumulated in the queue, an interactive media session can be initiated 410 between the host user and the plurality of audience users. Initiating 410 the interactive media session can be performed, for example, in response to the host user clicking a button or otherwise manipulating a user interface to indicate a request to initiate the session or accept initiation of the session, i.e., indicate that the host is ready to proceed. Additionally or alternatively, initiating 410 an interactive media session can be performed automatically at a predetermined time and day, upon a certain number of audience users joining the session, or upon the occurrence of another event or satisfaction of any other one or more conditions.

Once the session has been initiated 410, a question from the queue of the plurality of questions can be present 415 to the host user. For example, a question that has risen to the top of the queue based on audience user voting before initiation of the session can be presented first. In other cases, the questions can be ordered in the queue based on the order in which they were submitted with the first in time being at the top of the queue and thus presented first. Other arrangements for ordering the questions in the queue are contemplated and considered to be within the scope of the present disclosure. In some cases, the host user may have an option, e.g., through a button, link or other user interface element, to delete, ignore, skip, or postpone a presented 415 question. Otherwise, the host user can proceed with answering the presented 415 question, e.g., by clicking or otherwise manipulating another link, button, or other user interface element to indicate the start of the answer.

An answer to the question can be provided by the host user. This answer can be streamed in the interactive media session and recorded 420. Generally speaking, the answer can be recording in timed segments that can be combined into a single media clip for that question/answer. The individual clips can then be combined into a media recording for the complete session. Additional details of an exemplary process for recording media of the interactive media session will be described below with reference to FIG. 5. Once the answer has been provided by the host user, the queue of the plurality of questions can be updated 425 to remove the question provided to the host user and advance to the next question. Again, details of an exemplary process for managing the queue of questions will be described below with reference to FIG. 6.

A determination 430 can then be made as to whether the interactive media session has ended or should end. This determination can be based, for example, on a predefined number of questions being answered, a predefined time expiring, no questions remaining in the queue, input from the user indicating a request to end the session, or the occurrence of another event or satisfaction of another one or more conditions. In response to determining 430 the session has not yet ended or should not end, processing can continue to presenting 415 the next question from the queue, streaming and recording 420 the answer provided, and updating 425 the queue until a determination 430 is made that the session has ended or should end. In response to determining 430 the session has ended or should end, the session can be ended or closed thereby disconnecting the host user and the audience users. Additionally, in some cases, the recorded media clips for each question answered as well as the recorded media for the complete session can be made available for later viewing.

Figure 5:
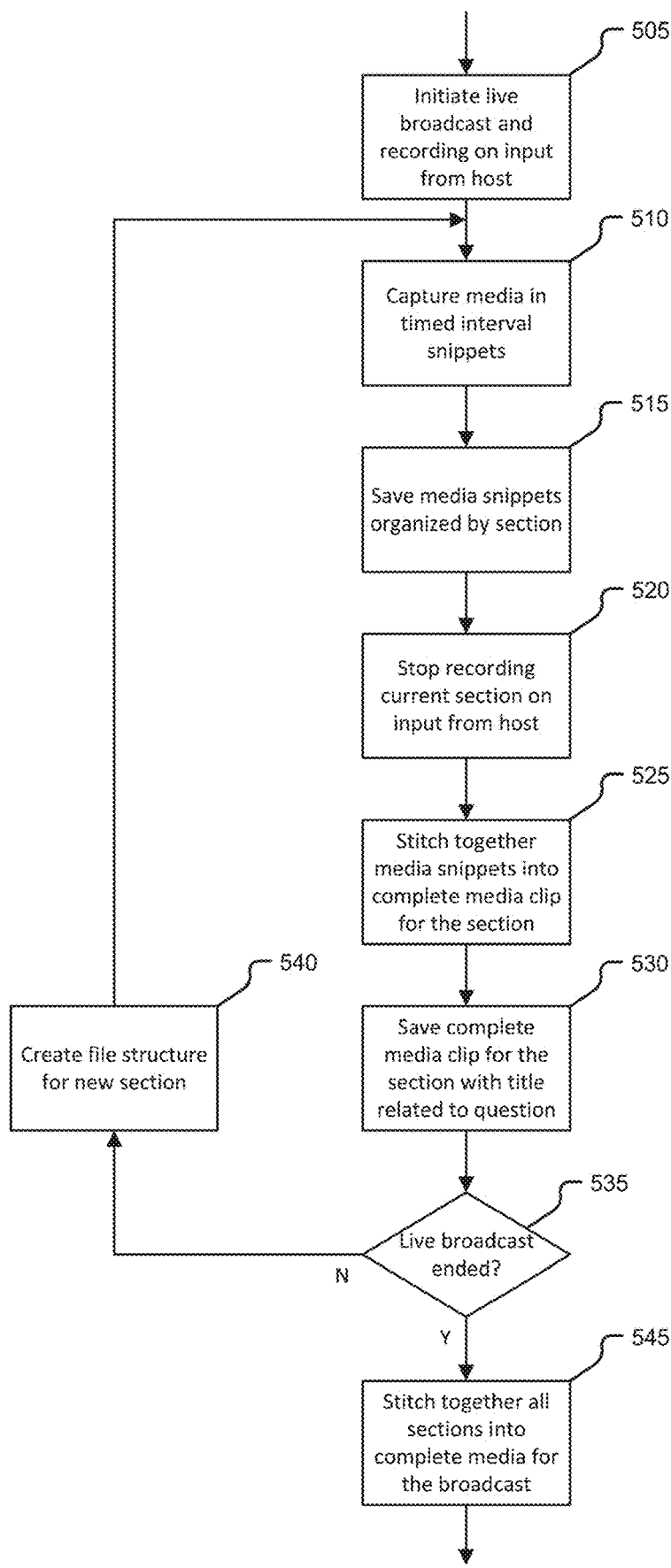
FIG. 5 is a flowchart illustrating an exemplary process for recording media segments in a media-based interaction according to one embodiment of the present disclosure.

FIG. 5 is a flowchart illustrating an exemplary process for recording media segments in a media-based interaction according to one embodiment of the present disclosure. According to one embodiment and as illustrated here, processing can begin with receiving 505 an input from the host user indicating a start of the media-based interaction. As noted above, this input can be received in response to the host user clicking a button or otherwise manipulating a user interface to indicate a request to initiate the session or accept initiation of the session, i.e., indicate that the host is ready to proceed. Initiating the interactive media session can be performed in response to receiving 505 the input from the host user indicating the start of the media-based interaction, and initiating the interactive media session can further comprise recording answers to each question in a media clip for that question/answer as well as recording the interactive media session.

Recording the answer to the question provided by the host user and recording the interactive media session can further comprise capturing 510 one or more media snippets based on a predefined time interval. Each captured media snippet can be saved 515 and organized into at least one of a plurality of sections, each section can be related to one of the plurality of questions, and a current section can be related to the currently presented question. Capturing 510 and saving 515 of snippets in the current section can continue while the host user continues to answer. At some point, an input can be received 520 from the host user indicating an end of the current section, i.e., the answer to the current question is complete. This input can be received 520 in response to the host user clicking a button or link or otherwise manipulating a user interface to indicate an end of the current answer. In other cases, the end may be determined and/or the input can be received 520 based on the expiration of a predefined amount of allotted time, silence from the host user for a predefined period of time, detection of a predefined work or spoken utterance, etc. In response to receiving 520 the input from the host user or otherwise receiving an indication of the end of the current section, the capturing 510 and saving 515 of the one or more media snippets for the current section/answer can be stopped.

Each saved 515 media snippet for the current section can then be stitched 525 together into a media clip for the current section, i.e., representing and containing the complete answer to the current question as provided by the host user. The resulting assembled media clip can then be saved 530 with a title related to, representing, or otherwise relating the saved 530 media clip to the presented and answered question. In this way, audience users can retrieve and review the answers to questions that they have a particular interest in and/or may have missed during the live broadcast by the host user.

A determination 535 can then be made as to whether the media-based interaction has ended. This determination 535 can be based, for example, on a predefined number of questions being answered, a predefined time expiring, no questions remaining in the queue, input from the user indicating a request to end the session, or the occurrence of another event or satisfaction of another one or more conditions. In response to determining 535 the media-based interaction has not ended, processing can continue for one or more subsequent questions and related media sections by repeating said capturing 510 one or more media snippets based on the predefined time interval, saving 515 each captured media snippet organized into at least one of a plurality of sections, receiving 520 an input from the host user indicating an end of the section, in response to receiving 520 the input from the host user indicating the end of the section, ending the capturing and saving of the one or more media snippets, stitching 525 together each saved media snippet into a media clip for the section, and saving 530 the media clip with a title related to the presented question until a determination is made that the media-based interaction has ended. In response to determining 535 the media-based interaction has ended, one or more saved 530 media clips can be stitched 545 together into a recorded media for the complete media-based interaction. This complete media recording can be saved and made available to users who may have missed the live presentation or who what to view the presentation again.

Figure 6:
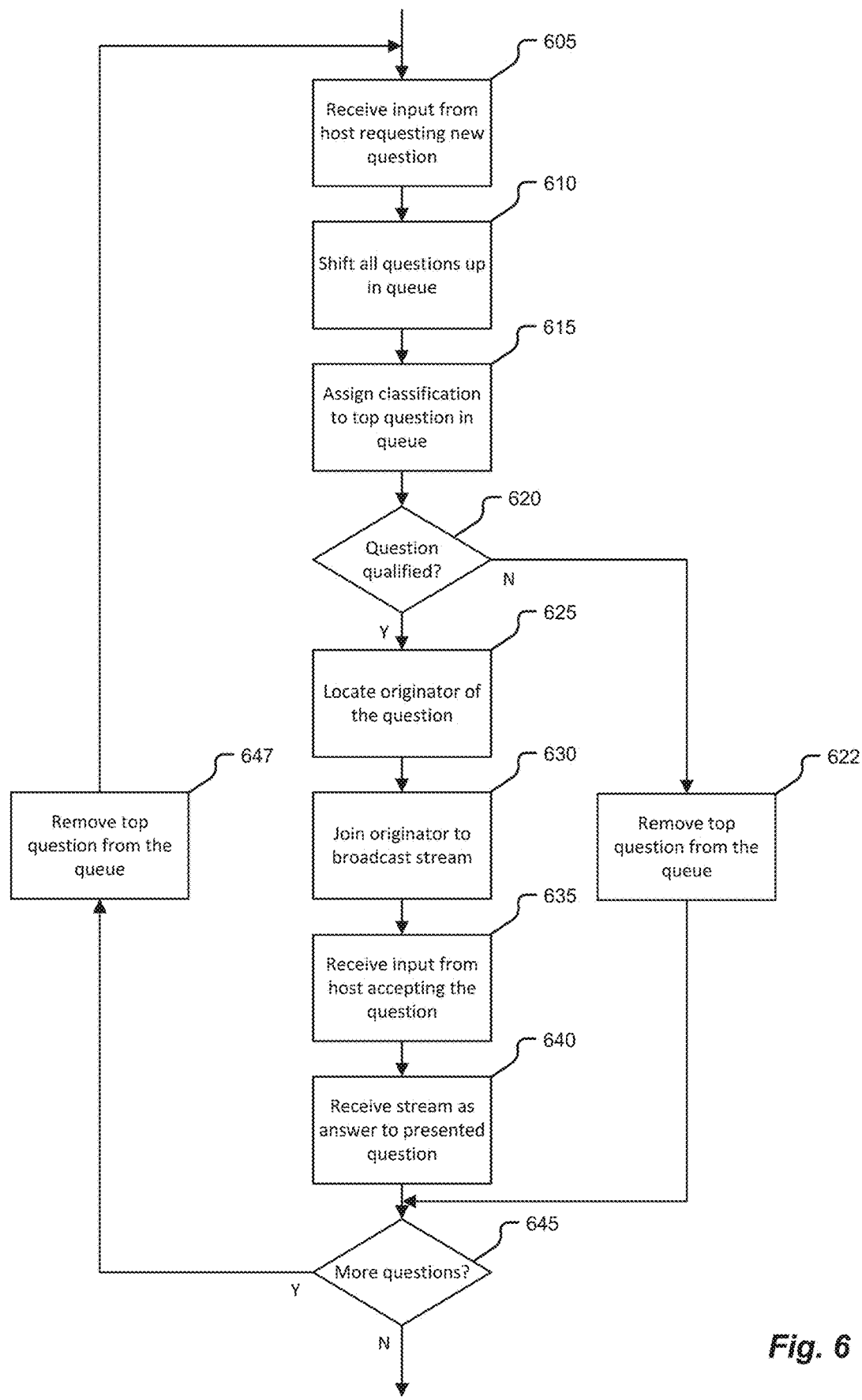
FIG. 6 is a flowchart illustrating an exemplary process for managing a queue of questions presented during a media-based interaction according to one embodiment of the present disclosure.

FIG. 6 is a flowchart illustrating an exemplary process for managing a queue of questions presented during a media-based interaction according to one embodiment of the present disclosure. As illustrated in this example, managing the queue of the plurality of questions can comprise receiving 605 an input from the host user indicating a request for a new question. This input can be received 605, for example, in response to the host user clicking a button or link or otherwise manipulating a user interface to indicate a request. In some cases, receiving 605 the input can comprise detecting a spoken command, phrase, or utterance. In response to receiving 605 this input, each question of the plurality of questions can be shifted 610 up in the queue. A classification can be assigned 615 to a top question in the queue of the plurality of questions. This classification can be assigned 615, for example, based on an analysis of the test of the question, determining whether the originator of the question is authorized to ask questions, e.g., the user has paid a fee or is otherwise pre-approved to ask questions, etc.

A determination 620 can be made based on the assigned classification as to whether the top question in the queue of the plurality of questions is qualified to be presented in the media-based interaction. In response to determining 620 the top question in the queue of the plurality of questions is not qualified to be presented in the media-based interaction, the top question can be removed 622 from the queue of the plurality of questions. Processing can then continue to determine 645 whether more questions remain in the queue. In response to determining 645 that more questions remain in the queue, processing can return to shifting 610 each question up in the queue, assigning 615 a classification to the top question in the queue, and determining 620 based on the assigned classification whether the top question in the queue is qualified.

In response to determining 620 the top question in the queue of the plurality of questions is qualified to be presented in the media-based interaction, audience users that it an originator of the top question in the queue can be located 625 and the located originator of the top question in the queue can be joined 630 to the interactive media session. Joining the originator of the question to the session can comprise adding that user to a broadcast of the session, adding an input stream, e.g., an audio or media stream, from that audience user to be added to the broadcast, etc. An input can be received 635 from the host user indicating acceptance of the top question in the queue of the plurality of questions. This input can be received 635, for example, in response to the host user clicking a button or link or otherwise manipulating a user interface to indicate acceptance of the question. An input stream comprising an answer from the host user to the top question can be received 640 and recorded as described above until the host user indicates an end of the answer or the end of the answer is otherwise detected as described.

After the answer has been completed, a determination 645 can be made as to whether more questions remain in the queue of the plurality of questions. In response to determining 645 more questions remain in the queue, processing can continue with removing 647 the top question from the queue and repeating said receiving 605 input from the host user indicating a request for a subsequent question, shifting 610 each question of the plurality of questions up in the queue, assigning 615 a classification to the top question in the queue, determining 620, based on the assigned classification whether the top question in the queue is qualified to be presented in the media-based interaction, in response to determining 620 the top question in the queue of the plurality of questions is not qualified to be presented in the media-based interaction, removing 622 the top question from the queue, in response to determining 620 the top question in the queue is qualified to be presented in the media-based interaction, locating 625 an originator of the top question in the queue, joining 630 the originator of the top question in the queue to the interactive media session, receiving 635 an input from the host user indicating acceptance of the top question in the queue, and receiving 640 an input stream comprising an answer from the host user to the top question of the queue until no questions remain in the queue or the session is otherwise ended as described above.

According to embodiments of the present disclosure, a number of different variations and additional details can be utilized depending upon the exact implementation. For example, the client devices described above can present a user interface that can vary widely between implementations without departing from the scope of the present invention. Some exemplary user interfaces will be described below for illustrative purposes only. It should be understood that these examples are not intended to limit the scope of the present disclosure. Rather, they are offered by way of example only in an effort to give a more thorough understanding of some possible implementations of various embodiments described herein. It should be further understood that in different implementations these interfaces can differ in format and/or content without departing from the scope of the present disclosure.

Figure 7:
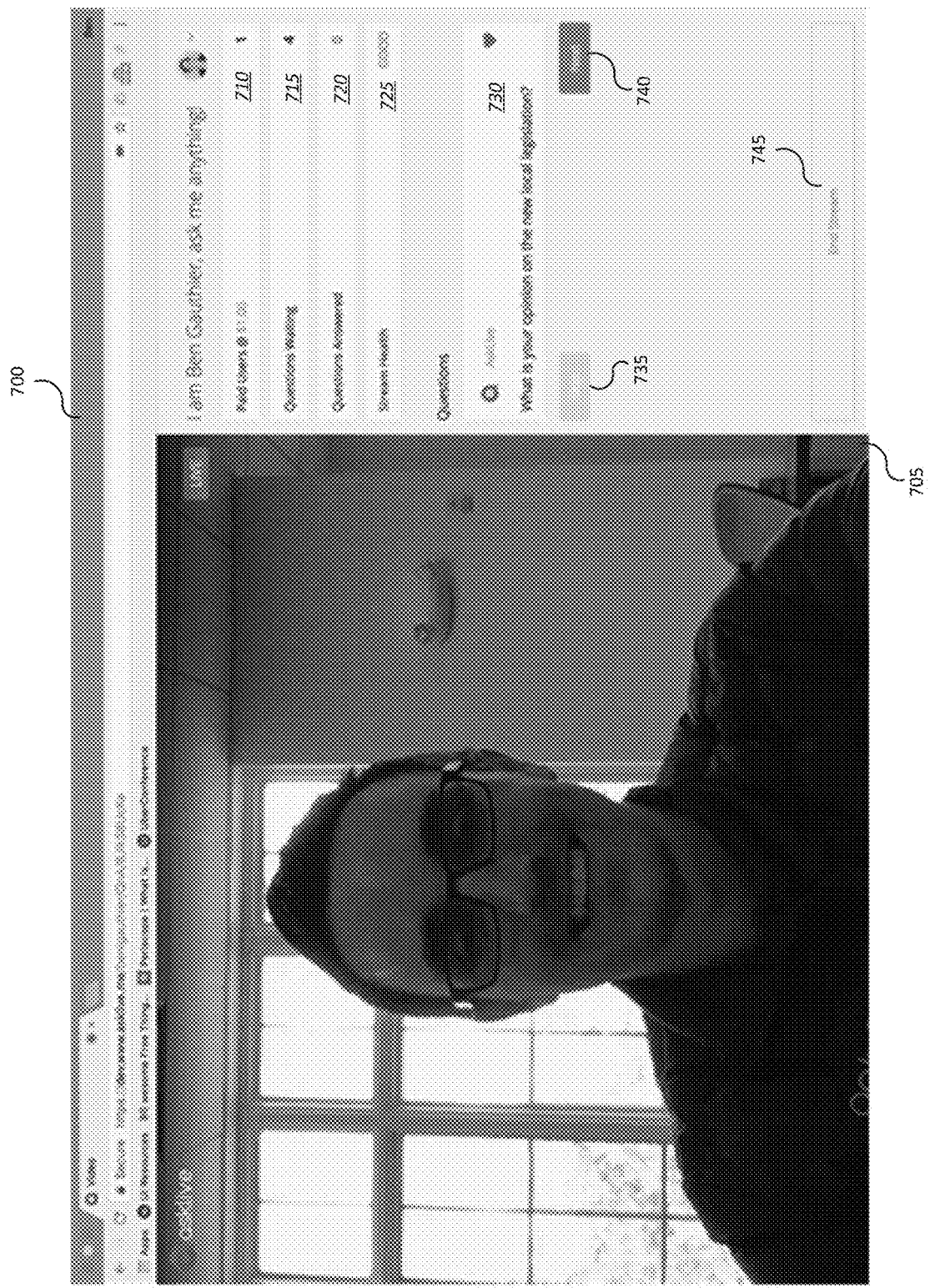
FIG. 7 is a screenshot illustrating an exemplary user interface for a host of a media-based interaction according to one embodiment of the present disclosure.

FIG. 7 is a screenshot illustrating an exemplary user interface for a host of a media-based interaction according to one embodiment of the present disclosure. More specifically, this example illustrates a webpage or similar interface 700 as may be rendered by a browser or other client application executing on the host user's client device. This interface 700 includes a stream viewing portion 705 in which can be displayed the current broadcast media stream. Additionally, a number of statistics and other information can be displayed. For example, the interface 700 can include a textual and/or graphical representation of the number of paid users 710 currently in the media session, the number of questions 715 currently pending in the queue of questions, the number of questions answered 720 in the session so far, a status of the media stream 725, and any number and/or variety of other information that may be useful to the host. Additionally, a representation of the current question 730, i.e., the top question in the question queue may be presented, including the actual text of that question. The interface 700 may also include a number of buttons, icon, links, and/or other controls. For example, the interface 700 can include a "Skip" button 735 that the host might use to skip the presented question 730, a "Next" button 740 that the host might use to advance the session to the next question in the queue after the answer to the current question 730 is complete, and an "End Stream" button 745 that the host might use to terminate the media session.

Figure 8:
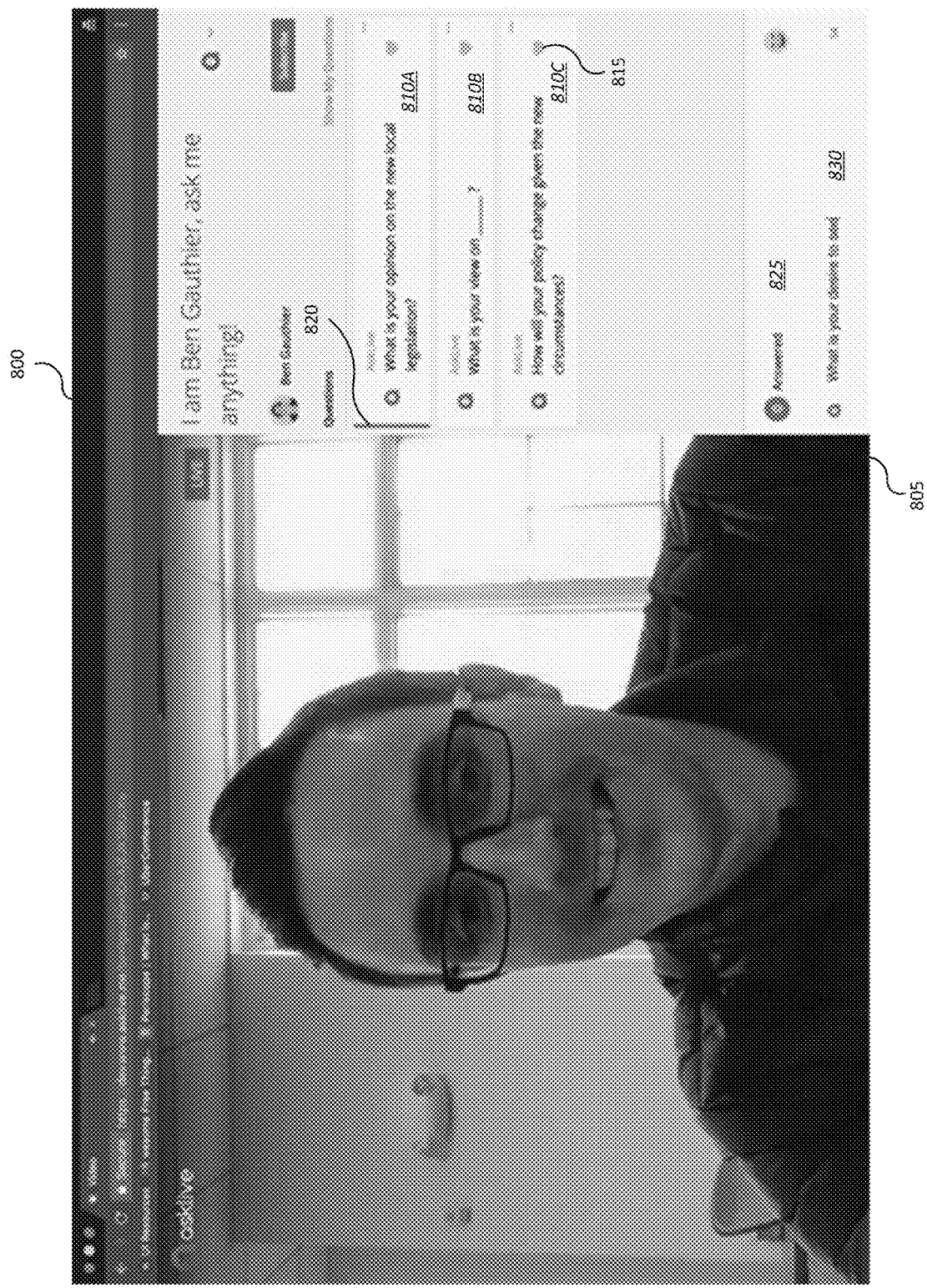
FIG. 8 is a screenshot illustrating an exemplary user interface for an audience attendee of a media-based interaction according to one embodiment of the present disclosure.

FIG. 8 is a screenshot illustrating an exemplary user interface for an audience attendee of a media-based interaction according to one embodiment of the present disclosure. More specifically, this example illustrates a webpage or similar interface 800 as may be rendered by a browser or other client application executing on the audience user's client device. This interface 800 includes a stream viewing portion 805 in which can be displayed the current broadcast media stream. Additionally, the interface 800 can include a list of the questions 810A-810C currently pending in the queue. The list of questions 810A-810C can include a textual representation of the question as well as an icon 815, such as a heart icon, for voting. The audience user can click or otherwise manipulate the user interface to select this icon to vote in favor of a particular question or questions. Also, an indication 820 of the current question, i.e., the one that the host is currently addressing, can be given. In this example, the indication 820 comprises a bar next to the text of the question but, in other implementations, can comprise any of a variety of different possible textual or graphical indications. The interface can also include a representation 825 of questions answered already in the session and a textbox 830 or other element through which the audience user may enter and submit a new question to be added to the queue.

Figure 9:
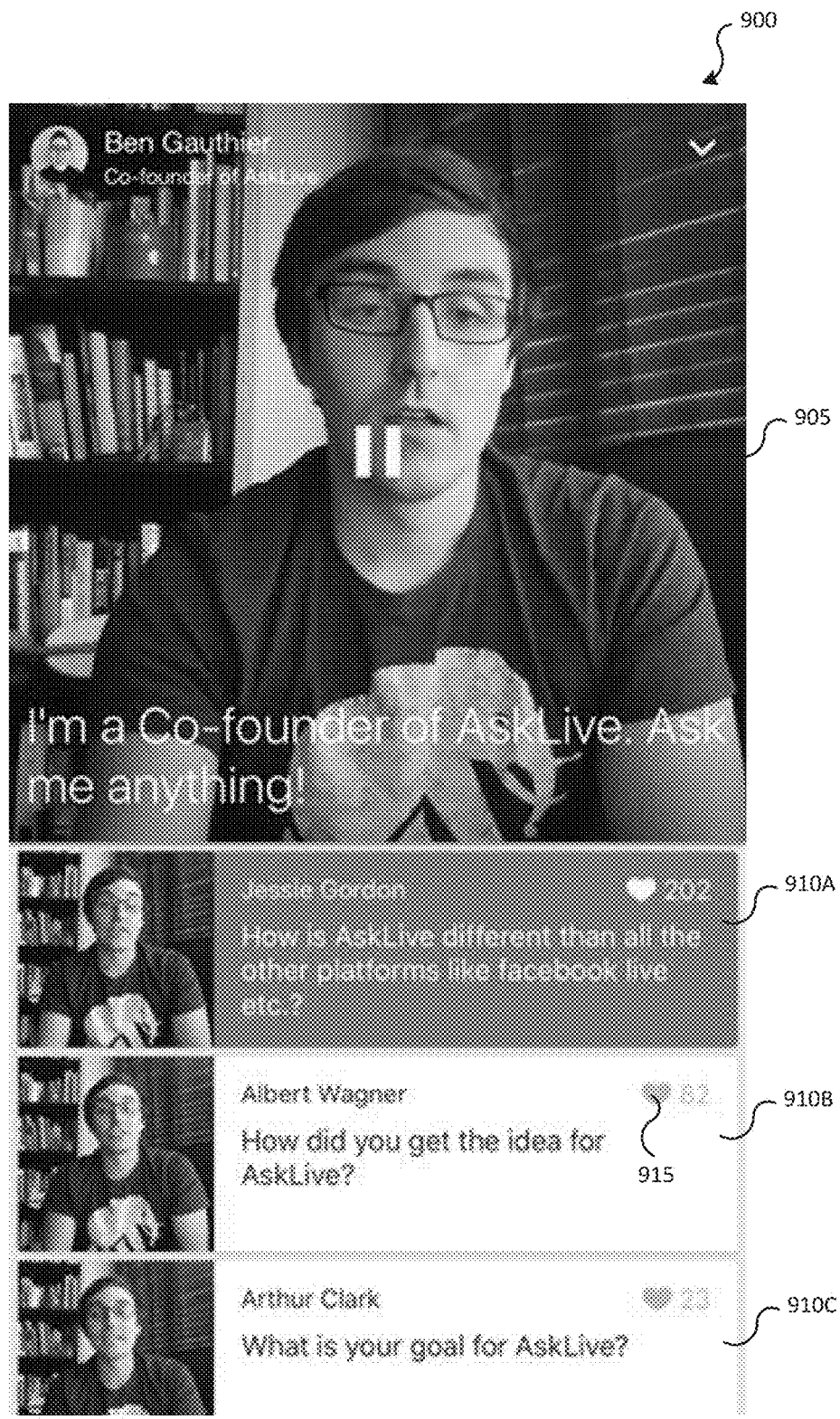
FIG. 9 is a screenshot illustrating an exemplary mobile interface for conducting a media-based interaction according to one embodiment of the present disclosure.

FIG. 9 is a screenshot illustrating an exemplary mobile interface for conducting a media-based interaction according to one embodiment of the present disclosure. More specifically, this example illustrates an interface 900 as may be rendered by an application executing on a mobile phone, tablet, etc., or on another type of device to make available and view previously recorded media clips. More specifically, the interface 900 includes a viewing section 905 in which a selected, previously recorded media clip may be played and a list of available media clips 910A-910C. Through this interface, the user may be able to scroll through, tap, or otherwise select one of the clips from the list of available media clips 910A-910C. In response, the selected clip 910A can be highlighted and played in the viewing section 905. Additionally, each clip in the list of available media clips 910A-910C can include an icon 915, such as a heart icon, for voting. The audience user can touch or otherwise manipulate the user interface to select this icon to vote in favor of a particular clip.

The present disclosure, in various aspects, embodiments, and/or configurations, includes components, methods, processes, systems, and/or apparatus substantially as depicted and described herein, including various aspects, embodiments, configurations embodiments, sub combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for conducting a media-based interaction between a host user and a plurality of audience users, the method comprising:
    managing, by an application server, a queue of a plurality of questions, each question of the plurality of questions presented by one of the plurality of audience users;
    receiving, by the application server, an input from the host user indicating a start of the media-based interaction;
    initiating, by the application server, an interactive media session between the host user and the plurality of audience users in response to receiving the input from the host user indicating the start of the media-based interaction;
    presenting, by the application server, a question from the queue of the plurality of questions to the host user;
    streaming, by the application server, in the interactive media session an answer to the question provided by the host user, wherein the answer to the question comprises a section of the interactive media session;
    capturing, by the application server, while streaming in the interactive media session the answer to the question provided by the host user, a plurality of separate, individual media snippets of the answer to the question provided by the host, each snippet captured from the interactive media session and having a duration based on a predefined time interval, wherein each snippet is shorter than the section of the interactive media session and wherein the section is shorter than the interactive media session;
    saving, by the application server, each captured media snippet organized into at least one of a plurality of sections, each section related to one of the plurality of questions and a current section related to the presented question;

continuing, by the application server, the capturing and saving of the plurality of separate, individual media snippets until an input from the host user indicating an end of the current section;

receiving, by the application server, the input from the host user indicating the end of the current section;

in response to receiving the input from the host user indicating the end of the current section, ending, by the application server, the capturing and saving of the plurality of separate, individual media snippets;

stitching together, by the application server, all saved media snippets for the current section into a media clip for the current section, wherein stitching together each saved media snippet comprises combining the saved media snippets into the media clip for the current section, and wherein the media clip comprises an entirety of the answer provided by the host user for the section;

saving, by the application server, the media clip with a title related to the presented question; and updating, by the application server, the queue of the plurality of questions to remove the question provided to the host user.

2. The method of claim 1, further comprising determining whether the media-based interaction has ended.

3. The method of claim 2, further comprising, in response to determining the media-based interaction has not ended, repeating said capturing the plurality of separate, individual media snippets based on the predefined time interval, saving each captured media snippet organized into at least one of a plurality of sections, each section related to a subsequent one of the plurality of questions and a subsequent section related to the subsequent question, receiving an input from the host user indicating an end of the subsequent section, in response to receiving the input from the host user indicating the end of the subsequent section, ending the capturing and saving of the plurality of separate, individual media snippets, stitching together each saved media snippet into a media clip for the subsequent section, and saving the media clip with a title related to the presented question until a determination is made that the media-based interaction has ended.

4. The method of claim 3, further comprising, in response to determining the media-based interaction has ended, stitching together a plurality of saved media clips into a media recording for the interactive media session, wherein stitching together the plurality of saved media clips comprises combining the saved media clips into the media recording for the entire interactive media session.

5. The method of claim 1, wherein managing the queue of the plurality of questions comprises:

receiving input from the host user indicating a request for a new question;

shifting each question of the plurality of questions up in the queue of the plurality of questions;

assigning a classification to a top question in the queue of the plurality of questions;

determining, based on the assigned classification whether the top question in the queue of the plurality of questions is qualified to be presented in the media-based interaction; and in response to determining the top question in the queue of the plurality of questions is not qualified to be presented in the media-based interaction, removing the top question from the queue of the plurality of questions.

6. The method of claim 5, further comprising, in response to determining the top question in the queue of the plurality of questions is qualified to be presented in the media-based interaction:

locating one of the audience users of the plurality of audience user comprising an originator of the top question in the queue of the plurality of questions;

joining the originator of the top question in the queue of the plurality of questions to the interactive media session;

receiving an input from the host user indicating acceptance of the top question in the queue of the plurality of questions;

receiving an input stream from the originator of the question;

removing the originator of the question from the interactive media session; and receiving an input stream comprising an answer from the host user to the top question of the queue of the plurality of questions.

7. The method of claim 6, further comprising determining whether more questions remain in the queue of the plurality of questions.

8. The method of claim 7, further comprising, in response to determining more questions remain in the queue of the plurality of questions, repeating said receiving input from the host user indicating a request for a subsequent question, shifting each question of the plurality of questions up in the queue of the plurality of questions, assigning a classification to the top question in the queue of the plurality of questions, determining, based on the assigned classification whether the top question in the queue of the plurality of questions is qualified to be presented in the media-based interaction, in response to determining the top question in the queue of the plurality of questions is not qualified to be presented in the media-based interaction, removing the top question from the queue of the plurality of questions, in response to determining the top question in the queue of the plurality of questions is qualified to be presented in the media-based interaction, locating one of the audience users of the plurality of audience user comprising an originator of the top question in the queue of the plurality of questions, joining the originator of the top question in the queue of the plurality of questions to the interactive media session, receiving an input from the host user indicating acceptance of the top question in the queue of the plurality of questions, and receiving an input stream comprising an answer from the host user to the top question of the queue of the plurality of questions.

9. The method of claim 5, further comprising receiving each of the plurality of questions in the queue and wherein at least one or the plurality of questions is received via a social media message.

10. The method of claim 9, wherein managing the queue of the plurality of questions comprises adding the questions to the queue in an order in which the questions are received and changing the order of the questions in the queue based on at least one or a popularity of the question, a popularity of an originator of the question, or a preference for the originator of the question.

11. A system comprising:
a processor; and
a memory coupled with and readable by the processor and having stored therein a set of instructions which, when executed by the processor, causes the processor to conduct a media-based interaction between a host user and a plurality of audience users by:

managing a queue of a plurality of questions, each question of the plurality of questions presented by one of the plurality of audience users;

receiving an input from the host user indicating a start of the media-based interaction;

initiating an interactive media session between the host user and the plurality of audience users in response to receiving the input from the host user indicating the start of the media-based interaction;

presenting a question from the queue of the plurality of questions to the host user;

streaming in the interactive media session an answer to the question provided by the host user, wherein the answer to the question comprises a section of the interactive media session;

capturing, while streaming in the interactive media session the answer to the question provided by the host user, a plurality of separate, individual media snippets of the answer to the question provided by the host, each snippet captured from the interactive media session and having a duration based on a predefined time interval, wherein each snippet is shorter than the section of the interactive media session and wherein the section is shorter than the interactive media session;

saving each captured media snippet organized into at least one of a plurality of sections, each section related to one of the plurality of questions and a current section related to the presented question;

continuing the capturing and saving of the plurality of separate, individual media snippets until an input from the host user indicating an end of the current section;

receiving the input from the host user indicating the end of the current section;

in response to receiving the input from the host user indicating the end of the current section, ending the capturing and saving of the plurality of separate, individual media snippets;

stitching together all saved media snippets for the current section into a media clip for the current section, wherein stitching together each saved media snippet comprises combining the saved media snippets into the media clip for the current section, and wherein the media clip comprises an entirety of the answer provided by the host user for the section;

saving the media clip with a title related to the presented question; and updating the queue of the plurality of questions to remove the question provided to the host user.

12. The system of claim 11, further comprising determining whether the media-based interaction has ended.

13. The system of claim 12, further comprising, in response to determining the media-based interaction has not ended, repeating said capturing the plurality of separate, individual media snippets based on the predefined time interval, saving each captured media snippet organized into at least one of a plurality of sections, each section related to a subsequent one of the plurality of questions and a subsequent section related to the subsequent question, receiving an input from the host user indicating an end of the subsequent section, in response to receiving the input from the host user indicating the end of the subsequent section, ending the capturing and saving of the plurality of separate, individual media snippets, stitching together each saved media snippet into a media clip for the subsequent section, and saving the media clip with a title related to the presented question until a determination is made that the media-based interaction has ended.

14. The system of claim 13, further comprising, in response to determining the media-based interaction has ended, stitching together a plurality of saved media clips into a media recording for the interactive media session, wherein stitching together the plurality of saved media clips comprises combining the saved media clips into the media recording for the entire interactive media session.

15. The system of claim 11, wherein managing the queue of the plurality of questions comprises:

receiving input from the host user indicating a request for a new question;

shifting each question of the plurality of questions up in the queue of the plurality of questions;

assigning a classification to a top question in the queue of the plurality of questions;

determining, based on the assigned classification whether the top question in the queue of the plurality of questions is qualified to be presented in the media-based interaction; and in response to determining the top question in the queue of the plurality of questions is not qualified to be presented in the media-based interaction, removing the top question from the queue of the plurality of questions.

16. The system of claim 15, further comprising, in response to determining the top question in the queue of the plurality of questions is qualified to be presented in the media-based interaction:

locating one of the audience users of the plurality of audience user comprising an originator of the top question in the queue of the plurality of questions;

joining the originator of the top question in the queue of the plurality of questions to the interactive media session;

receiving an input from the host user indicating acceptance of the top question in the queue of the plurality of questions;

receiving an input stream from the originator of the question;

removing the originator of the question from the interactive media session; and receiving an input stream comprising an answer from the host user to the top question of the queue of the plurality of questions.

17. The system of claim 11, further comprising determining whether more questions remain in the queue of the plurality of questions.

18. The system of claim 11, further comprising, in response to determining more questions remain in the queue of the plurality of questions, repeating said receiving input from the host user indicating a request for a subsequent question, shifting each question of the plurality of questions up in the queue of the plurality of questions, assigning a classification to the top question in the queue of the plurality of questions, determining, based on the assigned classification whether the top question in the queue of the plurality of questions is qualified to be presented in the media-based interaction, in response to determining the top question in the queue of the plurality of questions is not qualified to be presented in the media-based interaction, removing the top question from the queue of the plurality of questions, in response to determining the top question in the queue of the plurality of questions is qualified to be presented in the media-based interaction, locating one of the audience users of the plurality of audience user comprising an originator of the top question in the queue of the plurality of questions, joining the originator of the top question in the queue of the plurality of questions to the interactive media session, receiving an input from the host user indicating acceptance of the top question in the queue of the plurality of questions, and receiving an input stream comprising an answer from the host user to the top question of the queue of the plurality of questions.

19. A non-transitory computer-readable medium comprising a set of instructions stored therein which, when executed by a processor, causes the processor to conduct a media-based interaction between a host user and a plurality of audience users by:
   managing a queue of a plurality of questions, each question of the plurality of questions presented by one of the plurality of audience users;
   receiving an input from the host user indicating a start of the media-based interaction;
   initiating an interactive media session between the host user and the plurality of audience users in response to receiving the input from the host user indicating the start of the media-based interaction;
   presenting a question from the queue of the plurality of questions to the host user;
   streaming in the interactive media session an answer to the question provided by the host user, wherein the answer to the question comprises a section of the interactive media session;
   capturing, while streaming in the interactive media session the answer to the question provided by the host user, a plurality of separate, individual media snippets of the answer to the question provided by the host, each snippet captured from the interactive media session and having a duration based on a predefined time interval, wherein each snippet is shorter than the section of the interactive media session and wherein the section is shorter than the interactive media session;
   saving each captured media snippet organized into at least one of a plurality of sections, each section related to one of the plurality of questions and a current section related to the presented question;
   continuing the capturing and saving of the plurality of separate, individual media snippets until an input from the host user indicating an end of the current section;
   receiving the input from the host user indicating the end of the current section;
   in response to receiving the input from the host user indicating the end of the current section, ending the capturing and saving of the plurality of separate, individual media snippets;
   stitching together all saved media snippets for the current section into a media clip for the current section, wherein stitching together each saved media snippet comprises combining the saved media snippets into the media clip for the current section, and wherein the media clip comprises an entirety of the answer provided by the host user for the section;
   saving the media clip with a title related to the presented question; and
   updating the queue of the plurality of questions to remove the question provided to the host user.

20. The non-transitory computer-readable medium of claim 19, further comprising determining whether the media-based interaction has ended.

21. The non-transitory computer-readable medium of claim 20, further comprising, in response to determining the media-based interaction has not ended, repeating said capturing the plurality of separate, individual media snippets based on the predefined time interval, saving each captured media snippet organized into at least one of a plurality of sections, each section related to a subsequent one of the plurality of questions and a subsequent section related to the subsequent question, receiving an input from the host user indicating an end of the subsequent section, in response to receiving the input from the host user indicating the end of the subsequent section, ending the capturing and saving of the plurality of separate, individual media snippets, stitching together each saved media snippet into a media clip for the subsequent section, and saving the media clip with a title related to the presented question until a determination is made that the media-based interaction has ended.

22. The non-transitory computer-readable medium of claim 21, further comprising, in response to determining the media-based interaction has ended, stitching together a plurality of saved media clips into a media recording for the interactive media session, wherein stitching together the plurality of saved media clips comprises combining the saved media clips into the media recording for the entire interactive media session.

23. The non-transitory computer-readable medium of claim 19, wherein managing the queue of the plurality of questions comprises:
   receiving input from the host user indicating a request for a new question;
   shifting each question of the plurality of questions up in the queue of the plurality of questions;
   assigning a classification to a top question in the queue of the plurality of questions;
   determining, based on the assigned classification whether the top question in the queue of the plurality of questions is qualified to be presented in the media-based interaction; and
   in response to determining the top question in the queue of the plurality of questions is not qualified to be presented in the media-based interaction, removing the top question from the queue of the plurality of questions.

24. The non-transitory computer-readable medium of claim 23, further comprising, in response to determining the top question in the queue of the plurality of questions is qualified to be presented in the media-based interaction:
   locating one of the audience users of the plurality of audience user comprising an originator of the top question in the queue of the plurality of questions;
   joining the originator of the top question in the queue of the plurality of questions to the interactive media session;
   receiving an input from the host user indicating acceptance of the top question in the queue of the plurality of questions;
   receiving an input stream from the originator of the question;
   removing the originator of the question from the interactive media session; and
   receiving an input stream comprising an answer from the host user to the top question of the queue of the plurality of questions.

25. The non-transitory computer-readable medium of claim 24, further comprising determining whether more questions remain in the queue of the plurality of questions.

26. The non-transitory computer-readable medium of claim 25, further comprising, in response to determining more questions remain in the queue of the plurality of questions, repeating said receiving input from the host user indicating a request for a subsequent question, shifting each question of the plurality of questions up in the queue of the plurality of questions, assigning a classification to the top question in the queue of the plurality of questions, determining, based on the assigned classification whether the top question in the queue of the plurality of questions is qualified to be presented in the media-based interaction, in response to determining the top question in the queue of the plurality of questions is not qualified to be presented in the media-based interaction, removing the top question from the queue of the plurality of questions, in response to determining the top question in the queue of the plurality of questions is qualified to be presented in the media-based interaction, locating one of the audience users of the plurality of audience user comprising an originator of the top question in the queue of the plurality of questions, joining the originator of the top question in the queue of the plurality of questions to the interactive media session, receiving an input from the host user indicating acceptance of the top question in the queue of the plurality of questions, and receiving an input stream comprising an answer from the host user to the top question of the queue of the plurality of questions.

\* \* \* \* \*